(12) United States Patent
Shi et al.

(10) Patent No.: US 10,525,593 B1
(45) Date of Patent: Jan. 7, 2020

(54) SYSTEM AND METHOD FOR IMPROVING STORAGE DENSITY

(71) Applicant: Amazon Technologies, Inc., Seattle, WA (US)

(72) Inventors: Jane Shi, Oakland, MI (US); Eric Fitting, Methuen, MA (US); Abhilash Hitesh Shah, Bedford, NH (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/002,871

(22) Filed: Jun. 7, 2018

(51) Int. Cl.
| | |
|---|---|
| *B25J 9/16* | (2006.01) |
| *B65G 69/02* | (2006.01) |
| *B25J 9/10* | (2006.01) |
| *B65G 69/04* | (2006.01) |
| *B65G 1/04* | (2006.01) |
| *B25J 9/02* | (2006.01) |

(52) U.S. Cl.
CPC ............... *B25J 9/1664* (2013.01); *B25J 9/02* (2013.01); *B25J 9/10* (2013.01); *B25J 9/1697* (2013.01); *B65G 1/04* (2013.01); *B65G 69/02* (2013.01); *B65G 69/0425* (2013.01); *Y10S 901/08* (2013.01)

(58) Field of Classification Search
CPC ..... B25J 9/0096; B25J 9/1664; Y10S 901/08; B65G 69/0425; B65G 69/02
See application file for complete search history.

(56) References Cited

U.S. PATENT DOCUMENTS

| | | | | |
|---|---|---|---|---|
| 3,623,594 A | * | 11/1971 | Ravn | B65G 47/145 198/396 |
| 4,829,748 A | * | 5/1989 | Uehira | B65B 1/08 222/144 |
| 6,206,173 B1 | * | 3/2001 | Gallet | B65G 47/088 198/434 |
| 7,313,464 B1 | * | 12/2007 | Perreault | B25J 9/1666 318/568.1 |
| 2007/0227618 A1 | * | 10/2007 | Simonsen | B65G 69/02 141/78 |
| 2013/0032508 A1 | * | 2/2013 | Azuma | H01L 21/67333 206/710 |
| 2013/0277284 A1 | * | 10/2013 | Jones | B07C 5/02 209/587 |
| 2018/0082162 A1 | * | 3/2018 | Durham | G06K 7/10009 |
| 2019/0112086 A1 | * | 4/2019 | Klotz | B65B 35/00 |

\* cited by examiner

*Primary Examiner* — Thomas Randazzo
(74) *Attorney, Agent, or Firm* — Patterson + Sheridan, LLP (57) ABSTRACT

Embodiments herein describe a robotic pick and stow storage system with a built-in consolidation function that increases the storage density. The system can include a stowing robot, a consolidation robot, and individual containers. The stowing robot may pick an item, identify a free space in the container large enough for the item, and then place the item in the free space. The items placed in the container may have a space between it and a neighboring item or items (referred to herein as a stow buffer) due to uncertainties or inaccuracies in the stowing process. The embodiments herein describe a stow and consolidation action that reduces the stow buffers thereby providing additional space in the container for more items. The consolidation robot can tilt and vibrate the container such that the items move closer together thereby generating free space for additional items in the container.

20 Claims, 7 Drawing Sheets

SYSTEM AND METHOD FOR IMPROVING STORAGE DENSITY

BACKGROUND

The present invention relates to stowing items on a tray, and more specifically, to actuating the items in order to improve stowing density.

Stowing robots or machines can be used to place items in a container (e.g., a tray or tote) which is then stored for retrieval later. For example, during intake, items may be separated and individually stowed in a container. Later, in response to a customer order, the items may be retrieved from the container (e.g., one at a time) to fulfill the order. The stowing robot can use intelligent stow algorithms to maximize the number of items that can be placed in a container. However, storage density can deteriorate when the items are different from one another (e.g., random). The different sizes and shapes of the items can result in gaps between them which can reduce the density of the items in the container, which means more storage space is required.

BRIEF DESCRIPTION OF DRAWINGS

Various embodiments in accordance with the present disclosure will be described with reference to the drawings, where like designations denote like elements.

DETAILED DESCRIPTION

Embodiments herein describe a consolidation robot for improving the density of items placed on a transport surface of a container (e.g., a tray or tote). In a warehouse, items may be stored in a container that is then placed in a rack. To place the items in the container, a stowing robot may pick an item, identify a free space on the transport surface large enough for the item, and then place the item in the free space. In one embodiment, the stowing robot purposely places the items on the transport surface such that the items do not overlap. Put differently, the items in the container are placed next to each other on the transport surface so that one item does not overlap with another. Doing so makes it easier for the same robot (or a different robot) to later retrieve an item from the container.

Due to uncertainties or inaccuracies in the stowing process, the stowing robot may place the items on the container such that the each item has a space or gap between it and a neighboring item or items (referred to herein as a stow buffer). Thus, if a computer vision system is not sufficiently exact (e.g., a camera is not accurately calibrated), a positioning system of the robot has inaccuracies, or the items are deformable, the stowing robot can nonetheless place each item in the container using the stow buffers so the items do not overlap. Stated differently, adding a stow buffer around each item when placing the item on the container can compensate for the inaccuracies listed above and ensure the items do not overlap in the container.

However, the stow buffers reduce the storage density of the containers. For example, with the stow buffers, the items may cover only 75% of the available transport surface but if the stow buffers were reduced or removed, additional items may be added to the container thereby increasing the storage density. The embodiments herein describe a consolidation robot that reduces the stow buffers thereby providing additional space in the container for more items. For example, after placing multiple items on the tray, the consolidation robot can tilt and vibrate the container such that the items move closer together thereby reducing the stow buffers and generating free space for additional items in the container. By repeatedly vibrating the items, the consolidation robot can improve the storage density in the container which means more items can be stored using the same space in a container relative to a system that does not reduce the stow buffers.

Figure 1:
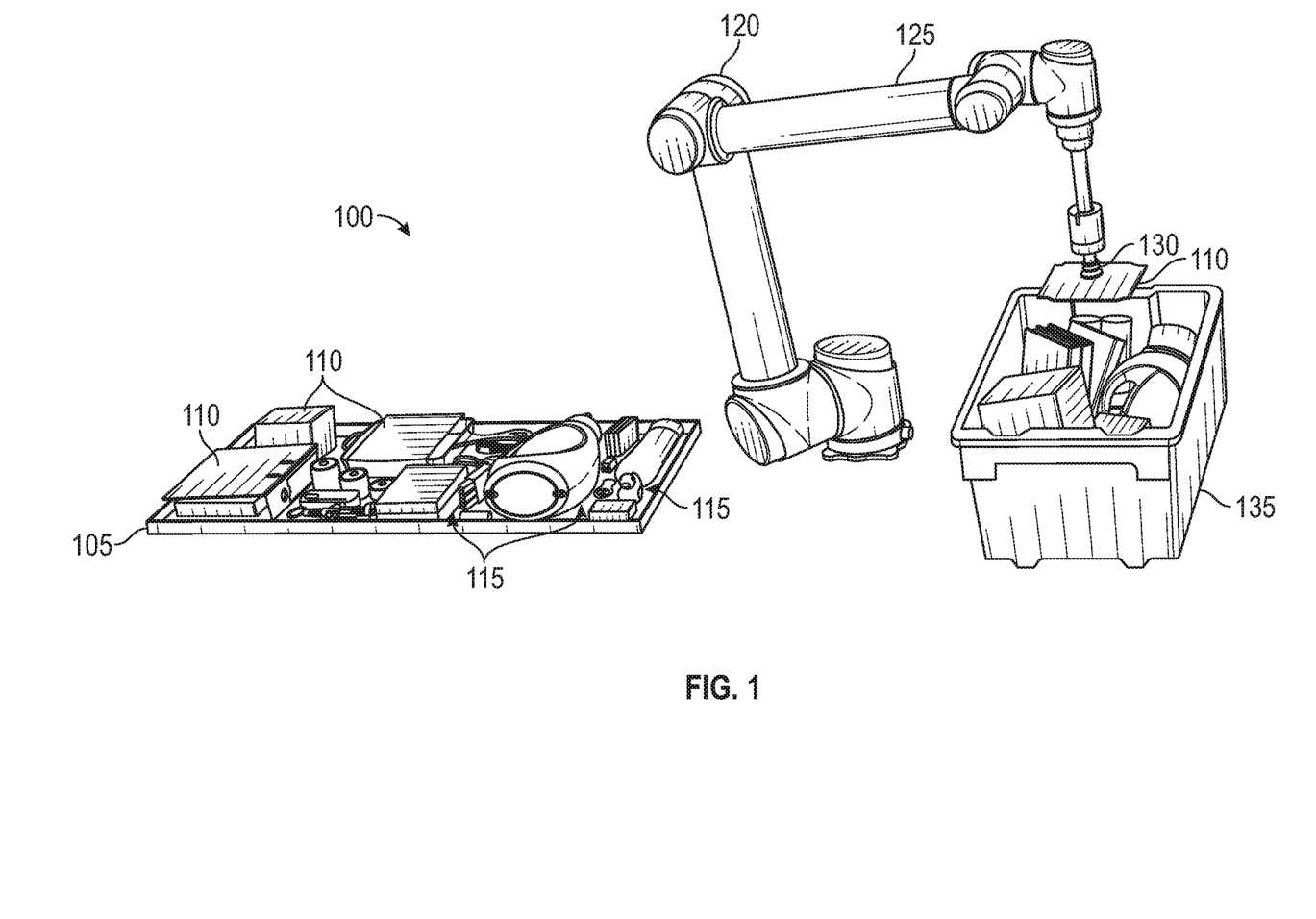
FIG. 1 is a stowing system for stowing items on a tray, according to one embodiment described herein.

FIG. 1 is a stowing system 100 for stowing items on a tray 105, according to one embodiment described herein. The stowing system 100 includes a stowing robot 120 which retrieves items 110 from a tote 135 and places these items in the tray 105. To do so, the robot 120 includes an arm 125 with an end effector 130 that can pick up an item 110 in the tote 135 and place the item 110 on the tray 105. In the example shown in FIG. 1, the end effector 130 is a suction cup which applies a vacuum to lift the item 110. However, in other embodiments the end effector 130 can use a grasping mechanism (e.g., a gripper) to move the items 110. Moreover, although a tray 105 is shown, the embodiments herein can be used with any container (with or without an outer wall or lip) that includes a bottom surface (e.g., a transport surface) for storing the items 110.

As discussed above, when stowing the items 110 on the transport surface of the tray 105, the stowing robot 120 may include a stow buffer 115 at least partially around the items so that the items do not overlap. The items 110 have different shapes and sizes and can be rigid or deformable. As such, the technique used by the stowing robot 120 to arrange the items 110 on tray 105 may have some uncertainties or inaccuracies that could result in the robot 120 placing the items 110 on top of each other if the robot 120 attempts to place the items 110 directly next to each other on the tray 105 rather than using the stow buffer 115. For example, a computer vision system used by the stowing robot 120 may not accurately define the outer boundaries of the items 110, and thus, misjudge the relative alignment of the items 110 when placed on the tray 105. This inaccuracy may be caused by a lack of precision in an algorithm used by the computer vision system, an uncalibrated camera, and the like. Moreover, the item 110 may be deformable (e.g., a bag of rice or an article of clothing in a bag) which means the shape of the item 110 may be unpredictable when placed on the tray. As such, the stowing robot 120 may add the stow buffers 115 when placing the items 110. In one embodiment, the stow buffer 115 is a spacing between one item 110 in the tray and another item in the tray 105 or a wall of the tray 105. The stow buffers 115 can be set based on a maximum error in the technique used by the stowing robot 120. For example, the stow buffer 115 may be set at 10% of the width or length of the item 110. The stow buffers 115 may be different for different types of items 110. For example, the stowing robot 120 may add a larger stow buffer 115 around a deformable item 110 than a rigid item 110. Doing so can help mitigate the likelihood the items 110 overlap on the tray 105 given the unpredictability of the precise contours of deformable items as discussed above.

Although the embodiments herein describe using stow buffers 115 between items with different form factors and rigidity, stow buffers 115 may be used when items have the same form factor and rigidity. That is, when stowing the items with the same shape and size onto the tray 105, the technique used by the stowing robot 120 may nonetheless have uncertainties or inaccuracies like the ones described above that could result in the robot 120 placing the items 110 on top of each other if the robot 120 attempts to place the items 110 directly next to each other on the tray 105. As such, the stowing robot 120 may use the stow buffers 115 when stowing the same or similar items on the tray to mitigate the risk that the items overlap.

However, the stow buffers 115 represent space on the bottom surface of the tray 105 that is not used to store items. As such, for some stowing techniques which implement stow buffers, a significant portion of the bottom surface of the tray 105 (e.g., 25%) may be unused. If the stow buffers 115 where reduced or eliminated between two items or between an item and the wall of the tray 105, additional items could be placed in the tray thereby increasing its storage density. That is, after the stow buffers 115 shown in FIG. 1 are reduced, the stowing robot 120 can add more items 110 from the tote 135 onto the tray 105.

Figure 2:
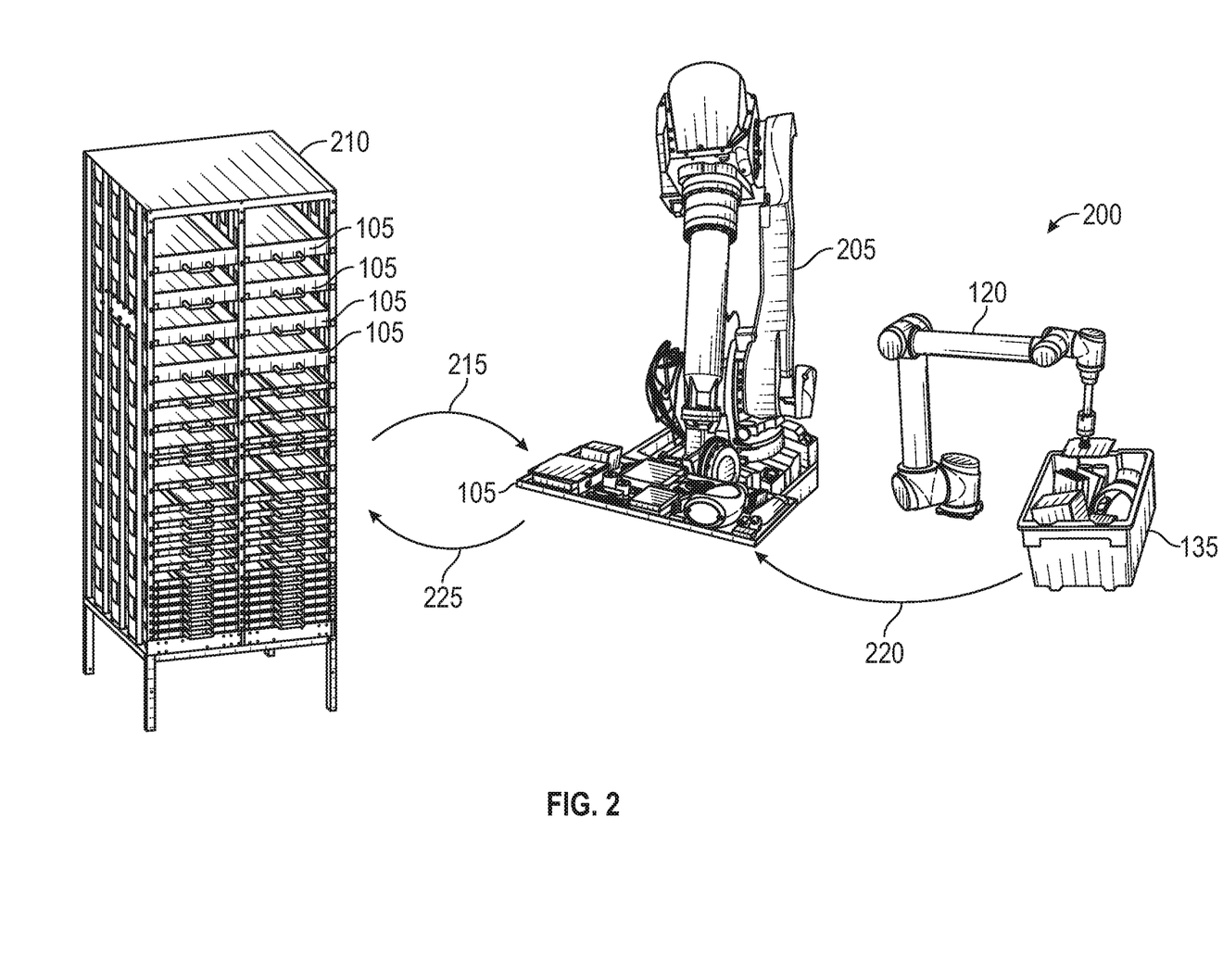
FIG. 2 is a robotic pick and stow storage system that includes individual containers, a stowing robot, and a consolidation robot for reducing stow buffers between items, according to one embodiment described herein.

FIG. 2 is a robotic pick and stow system 200 that includes a consolidation robot 205 for reducing stow buffers between items, according to one embodiment described herein. The pick and stow system 200 includes a rack 210 that can store multiple trays 105. As shown, the trays 105 can be spaced apart different vertical distances in the rack 210 for accommodating different sized items. For example, if a particular tray 105 has taller items, it may be placed in an upper portion of the rack 210 which includes more head room between the trays 105.

As shown by arrow 215, the consolidation robot 205 retrieves the tray 105 from the rack 210. Although not shown, the consolidation robot 205 includes a tray connector disposed at the end of an arm that permits the robot 205 to retrieve any one of the trays 105 from the rack 210. The consolidation robot 205 can then move the tray 105 to a stowing position. As shown by an arrow 220, the stowing robot 120 retrieves an item from the tote 135 (or any other immediate position, i.e., retrieves the item indirectly from the tote 135) and stows the item on the tray 105. For example, when a new tote 135 arrives at the pick and stow system 200, the consolidation robot 205 may retrieve a tray 105 from a location in the rack 210 that includes sufficient head room for the items in the tote 135. The stowing robot 120 can then place the items on the tray 105 as described in FIG. 1. To increase storage density, the consolidation robot 205 performs a consolidation action to reduce the stow buffers in the tray 105, thereby moving the items closer to each other and/or closer to an edge of the tray 105. This consolidation action may include titling and vibrating the tray 105 which is described in more detail later.

The consolidation action frees up additional area on the bottom surface of the tray 105 which the stowing robot 120 can use to place more items from the tote 135 onto the tray 105. Once the tray 105 is full or the stowing robot 120 has run out of items to stow, the consolidation robot 205 places the tray 105 back into the rack 210 as shown by arrow 225. In one embodiment, the stowing action performed by the stowing robot 120 and the consolidation action performed by the consolidation robot 205 are controlled to mitigate a risk that the items disposed on the tray 105 overlap. Thus, when retrieving items from the tray 105, the items can be retrieved without first moving an item that may overlap the desired item. For example, in response to a customer order, a controller instructs a robot (which can be the consolidation robot or a different type of robot) to retrieve the tray 105 from the rack 210 that stores an item listed in the order. That is, as each item is placed in the trays 105, an inventory tracking system can store a record indicating the tray 105 containing each item. Thus, when a customer order is received, the inventory tracking system can identify the tray 105 and instruct a robot to retrieve the tray 105 form the rack 210.

If the item listed in the order is not overlapped by another item, a picking robot (which may be the same as the stowing robot 120 but does not have to be) can retrieve the item from the tray 105. However, if the item is overlapped by another item, attempting to pick the item may fail because the overlapping item may prevent the picking algorithm from recognizing the item or the picking robot from grasping the item or establishing a valid grasping position on a surface of the item. The item may fall off the tray 105 when the picking item begins to lift the item off the tray 105. As such, the picking robot may need help from an associate or may perform an intermediate step (such as moving the overlapping item) before retrieving the desired item. Thus, the stowing and consolidation actions may reduce the stow buffers (and thus create space for additional items) while minimizing or preventing overlap between the items.

Figure 3:
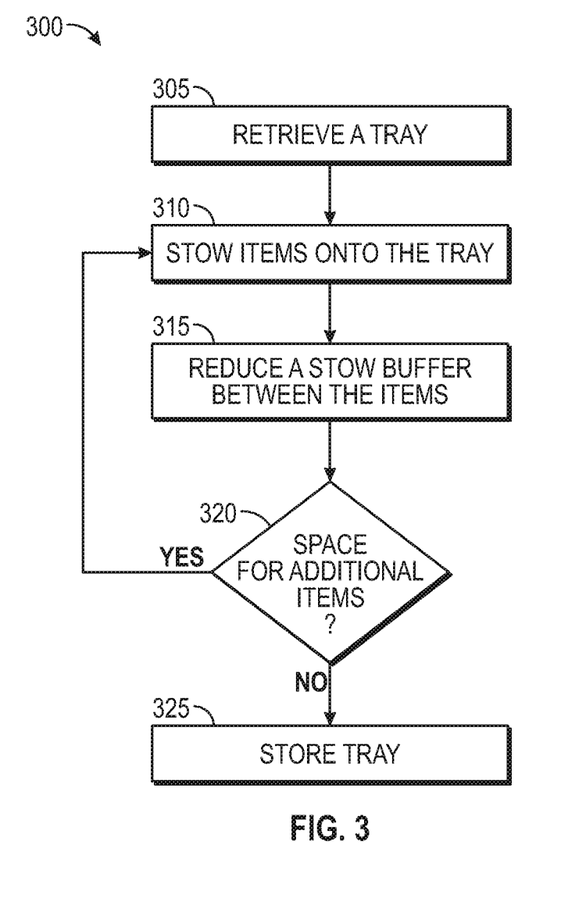
FIG. 3 is a flowchart for reducing stow buffers in a tray to increase storage density, according to one embodiment described herein.

FIG. 3 is a flowchart of a method 300 for reducing stow buffers in a tray to increase storage density, according to one embodiment described herein. At block 305, the consolidation robot retrieves a tray (or other type of container) from a rack. The tray may be empty or may include previously stored items. For example, some trays may be reserved to store special items (e.g., items of a certain height or length). Thus, when one of those items arrives, the consolidation robot retrieves the tray reserved for that special item which may have other items already disposed thereon.

At block 310, the stowing robot stows items onto the tray. The particular algorithm or technique used by the stowing robot can vary. For example, the stowing robot can rely on a computer vision system to identify available area in the tray and determine an orientation of the item that fits in the available area. In one embodiment, the stowing robot may consider a plurality of items and choose the item that best fits the available area on the tray to increase storage density. Regardless of the technique used, in one embodiment, the stowing robot adds at least one stow buffer between the item being placed on the tray and another item already placed on the tray, or between the item being placed and an edge (e.g., a wall or lip) of the tray. As mentioned above, the stow buffer or buffers around an item can mitigate the negative impact of uncertainties and inaccuracies in the stowing technique which could result in overlapping items on the tray.

At block 315, the consolidation robot performs a consolidation action to reduce a stow buffer between the items on the tray or between an item and an edge of the tray. In one embodiment, the consolidation robot tilts the tray along at least one axis and applies a pattern of movement to the tray (e.g., a vibration) which permits the items to move on the tray. Because of the tilt, the items may move closer together thereby reducing the stow buffers between the items. Mitigating the stow buffers can free up additional space on a particular side, or a fixed location, of the tray. Using FIG. 2 as an example, the consolidation robot 205 may tilt the tray 105 such that the left side is lowered and the right side is raised. As the items move to the left as a result of the consolidation action, this frees up additional space on the right side of the tray 105.

At block 320, the stowing robot or stowing system determines whether there is space on the tray for additional items. Put differently, the stowing robot determines whether performing the consolidation action freed sufficient space for stowing another item on the tray. For example, if the stowing robot has a plurality of items ready to be stowed on the tray, the robot may first stow the large items on the tray and use the consolidation action at block 315 to reduce the stow buffer between these items. The stowing robot can then determine whether the space made available by the consolation action is sufficient for smaller items. If so, the method 300 returns to block 310 where one or more additional items are placed on the tray. At block 315, the consolidation robot can again perform a consolidation action to reduce the stow buffers between the new items placed on the tray. In this example, the stowing and consolidation robot can repeat the stowing and consolidation actions to stow progressively smaller items on the tray.

However, if at block 320, the stowing robot determines there is insufficient space to store an item on the tray, the method 300 proceeds to block 325 where the consolidation robot stores the tray. The consolidation robot may then retrieve a new, empty tray and the method 300 could repeat until all the items received by the stowing robot are placed on a tray.

Figure 4:
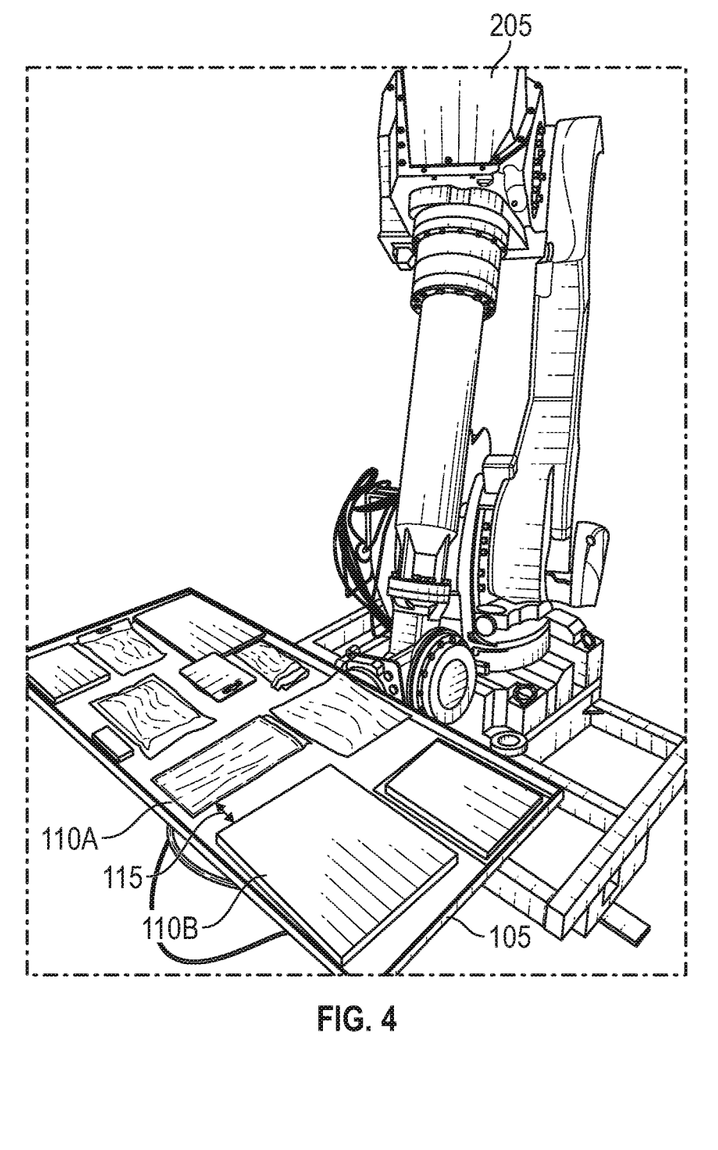
FIG. 4 illustrates a tray before reducing the stow buffers, according to one embodiment described herein.

FIG. 4 illustrates a tray 105 before reducing the stow buffers, according to one embodiment described herein. As shown, the tray 105 is held by an arm of the consolidation robot 205. In one embodiment, the tray 105 illustrates a scenario where the stowing robot (not shown) has filled the tray 105 using its stowing algorithm. That is, the stowing robot has placed as many items as it can on the tray 105. However, the number of items 110 placed on the tray 105 is limited by the stow buffer 115 between the items 110. In this case, the stow buffer is illustrated between the item 110A and the item 110B. However, the stowing robot may also use stow buffers between the items 110 and the edge of the tray 105.

In one embodiment, after the stowing robot determines it cannot place any more items, the stowing robot (or its controller) sends a notification to the consolidation robot 205 (or its controller). In response, the consolidation robot 205 performs a consolidation action as described above where the robot 205 tilts the tray 205 and actuates the items 110 so that they move in a common direction and the stow buffer or buffers 115 are reduced.

Figure 5:
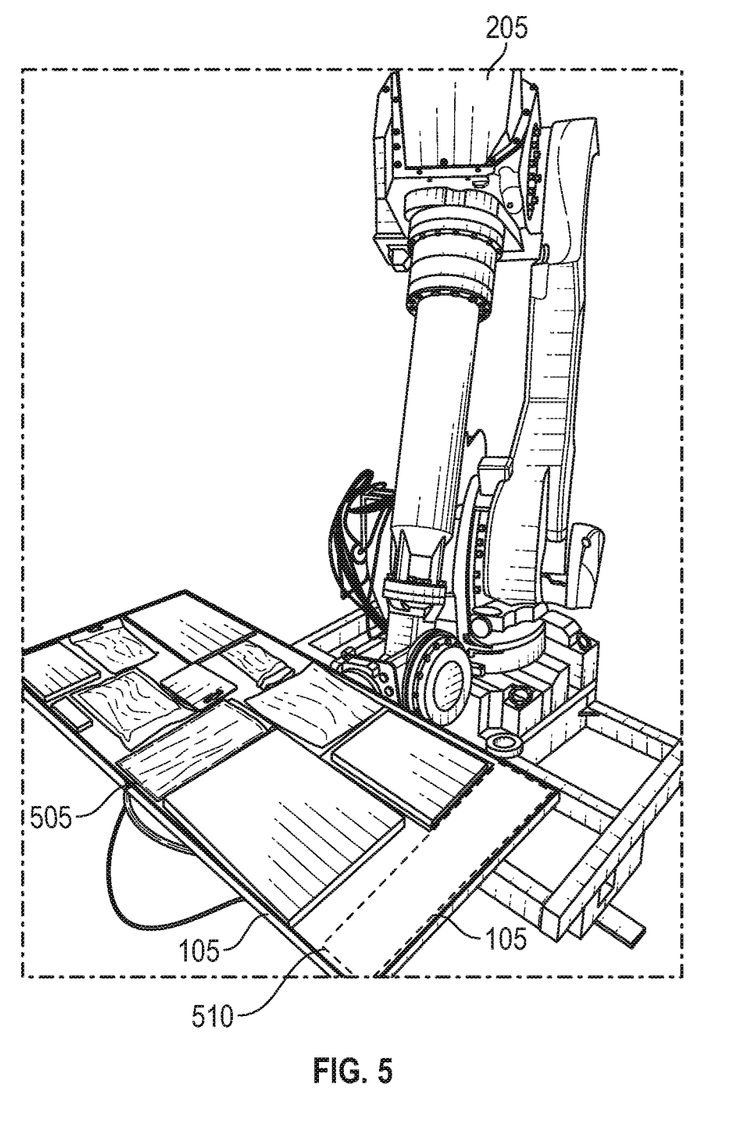
FIG. 5 illustrates the tray in FIG. 4 after reducing the stow buffers, according to one embodiment described herein.

FIG. 5 illustrates the tray in FIG. 4 after reducing the stow buffers, according to one embodiment described herein. That is, FIG. 5 illustrates the result of performing a consolidation action on the tray 105. As can be seen, the consolidation action results in a reduced stow buffer 505 between the items 110A and 110B. Stated differently, the spacing between the items 110 is reduced.

The reduction of the stow buffers 115 results in creating an available space 510. Put differently, the space saved from reducing or eliminating the stow buffers is consolidated to create the available space 510. In one embodiment, the available space 510 is created on the higher side of the tray 105 when tilting the tray 105 during the consolidation action. That is, by controlling the tilt of the tray 105, the consolidation robot 205 can control where the available space 510 is created.

When the consolidation action is finished, the consolidation robot 205 (or its controller) can signal the stowing robot. In response, the stowing robot can identify the available space 510 and use its stowing algorithm to determine whether the robot can place another item 110 on the tray 105. For example, the stowing robot can use a computer vision system to identify the available space 510 on the tray 105 and then identify, by determining the shape or boundary of the items available for stow, whether one of the items can fit in the available space 510. Further, the stowing robot may identify the optimal orientation of the item 110 that but uses the available space 510. In one embodiment, the stowing robot continues to place items until the tray 105 is again full—e.g., the stowing robot cannot identify any available space large enough to accommodate one of the items to be stowed and its surrounding stow buffer. The process can then repeat where the stowing robot signals the consolidation robot to again perform a consolidation action to mitigate the stow buffers and create a new available space. As discussed above with the method 300, the process may terminate when the available space 510 created from performing a consolidation action is not sufficient for the stowing robot to stow any item in the space. For example, the stowing robot may have only large items to stow which are too large for the available space 510.

Figure 6:
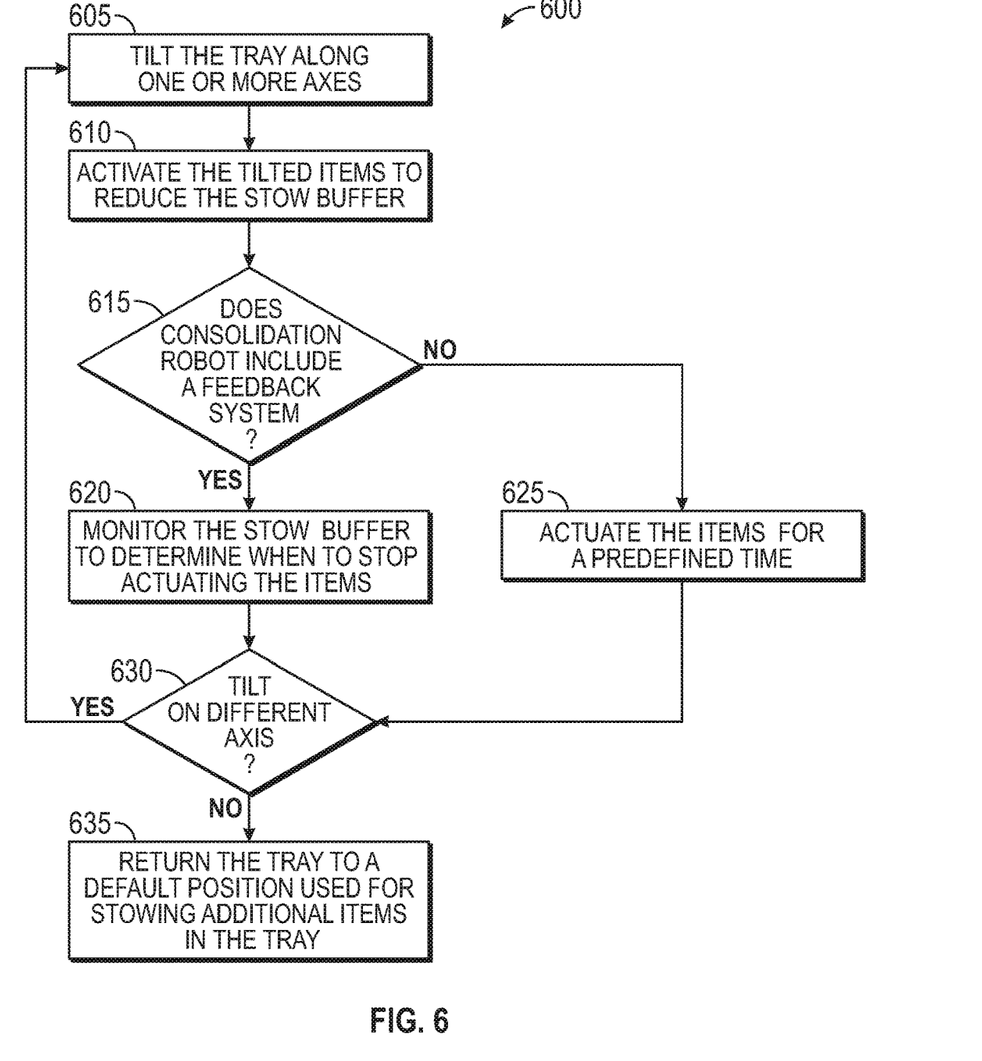
FIG. 6 is a flowchart for tilting a tray and actuating the items to reduce stow buffers, according to one embodiment described herein.

FIG. 6 is a flowchart of a method 600 for tilting a tray and actuating the items to reduce stow buffers, according to one embodiment described herein. In one embodiment, the method 600 is an example of block 315 of the method 300 where the stow buffer is reduced between the items by performing a consolidation action. As such, the method 600 may begin after block 310 of the method 300.

Figure 7:
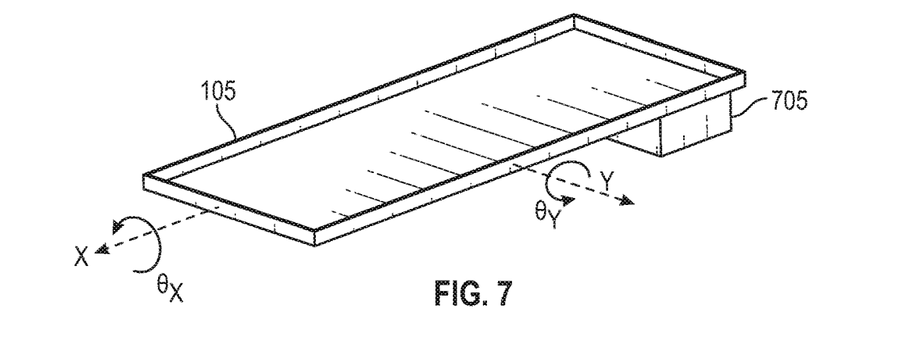
FIG. 7 illustrates tilting axes on a tray, according to one embodiment described herein.

At block 605, the consolidation robot tilts the tray along one or more axes. FIG. 7 illustrates axes on a tray 105, according to one embodiment described herein. In this embodiment, the consolidation robot can tilt or rotate the tray 105 on the Y and X axes which are perpendicular to each other. That is, rotating the tray 105 along the X axis causes the tray to rotate as illustrated by $\theta_x$ while titling the tray 105 along the Y axis causes the tray to rotate as illustrated by $\theta_y$. The consolidation robot can tilt the tray along only one of the axis or a combination of both of the axes. Moreover, the axes on which the tray 105 is tilted may depend on how items are moving which can be different for different groups of items.

At block 610, a vibration motor activates the tilted items to reduce the stow buffers in the tray. For example, in FIG. 7, the tray 105 includes a vibration motor 705 mounted on the underside of the tray 105. Although shown as being on the tray, in one embodiment, the motor 705 may be mounted on an end of arm tool (EOAT) on the consolidation robot which holds the tray 105. In one embodiment, the vibration motor 705 includes a piston that rapidly moves forwards and backwards along an axis. For example, the piston may move along an axis that is parallel with the X or Y axis or move along an axis that is perpendicular to both these axes (e.g., a Z axis). The movement of the piston vibrates the tray 105 which causes the items on the tray 105 to move in the direction to the tray is titled (e.g., towards a lower side or corner of the tray).

In another embodiment the vibration motor 705 includes a weight that is spun or rotated to vibrate the tray 105. The weight causes the items on the tray 105 to also slide along the tray 105 and move in the direction the tray 105 is titled. The weight may spin in the same plane as the bottom of the tray or spin in a plane perpendicular to the bottom of the tray 105. Although FIG. 7 illustrates placing the vibration motor 705 on the tray 105, the motor may be disposed on the consolidation robot. For example, while holding the tray 105, the consolidation robot brings a vibration motor into contact with the tray 105 to vibrate the tray and the items on it.

In one embodiment, the tray is titled along a single axis (e.g., the X or Y axis illustrated in FIG. 7). While tilted, the consolidation robot (or a controller) activates the vibration motor to move the items to a lower side or corner of the tray which reduces the stow buffer between the items. In another embodiment, the tray is titled along multiple axes, and while doing so, the vibration motor is activated to reduce the stow buffer.

Although block 605 is shown in the method 600 as occurring before block 610, these blocks can be performed in reverse order or simultaneously. For example, the consolidation robot may activate the vibration motor before the tray is tilted or while the tray is being tilted. Moreover, the consolidation robot may change the strength of the vibrations while setting the tilt of the tray (e.g., when initially tilting the tray from a default position or when changing the tilt of the tray). That is, the consolidation robot can start or stop the vibration motor at intervals, or increase and decrease the frequency of the vibrations while changing the tilt of the tray.

At block 615, the method 600 determines whether the consolidation robot includes a feedback system used to determine when to stop the vibration motor. The feedback system may include a computer vision system that captures images of the items on the tray. In one embodiment, the computer vision system monitors the stow buffers between the items on the tray. Put differently, at block 620, the feedback system monitors the stow buffers to determine when to stop actuating the items on the tray. When two items in the tray (which were previously separated by a stow buffer) contact, the feedback system stops the vibration monitor. One advantage of doing so is that the vibration motor can remain active to reduce the stow buffers until two items in the tray begin to contact (or the stow buffer is reduced to a predefined minimum threshold) but the vibration motor is stopped before two items overlap which can introduce errors into the picking process performed later.

If, however, the consolidation system does not include a feedback system, the method 600 proceeds to block 625 where the consolidation robot activates the items for a predefined time. For example, the predefined time may be set based on experimental data that indicates a length of time sufficient to reduce the stow buffers but does not cause overlap. In one embodiment, the consolidation robot selects different predefined times in response to the type of items on the tray 105. For example, different types of packaging may react or move differently in response to the vibrations caused by the vibration motor. An item with hard packaging or low-friction outer texture (e.g., an item in a cardboard box) may move or slide faster than an item with soft packaging or high-friction outer texture (e.g., a deformable item wrapped in plastic wrap). Other attributes of the packaging that can be considered include the fragility or rigidity of the packaging, or the paint on the outer surface which affects the friction between the packaging and the tray. An inventory tracking system may inform the consolidation robot the packaging type of items currently on the tray, and in response, the consolidation robot selects a predefined time corresponding to that type of item. In a scenario where the tray includes items with different packaging types, the consolidation robot may select a predefined time corresponding to an item on the tray that moves the fastest in response to the vibration motor. Doing so may reduce the likelihood that two items will overlap each other at the end of the predefined time.

In addition to controlling the time the vibration motor is active, the consolidation robot can control the strength of the vibration motor to prevent overlap. For example, the consolidation robot may vary the strength of the vibration motor based on the type of packaging of the items. For harder types of packaging (e.g., a hardcover book or a cardboard box), the vibration motor may use smaller vibrations to effect motion when compared with softer types of packaging (e.g., a bag of rice). In one embodiment, the vibration motor can control the strength of the resulting vibrations by controlling the amplitude of a vibration control signal and the frequency of the signal. For example, increasing the amplitude or the frequency of the control signal increases the strength of the vibrations while decreasing the amplitude or the frequency of the control signal decreases the strength of the vibrations.

At block 630, the consolidation robot determines whether to tilt the tray on a different axis. For example, during block 605, the consolidation robot may tilt the tray ten degrees along the X axis. At block 630, the method 600 may decide to return to block 605 where the tray is also titled ten degrees along the Y axis so that the tray is now tilted ten degrees on both the X and Y axes. Blocks 610-625 are then repeated as described above. In one embodiment, the consolidation robot repeats blocks 605-625 to perform a rocking motion where the tray is first tilted along one axis ten degrees, the vibration motor is activated, and then titled along a second axis ten degrees. After again activating the vibration motor, the consolidation robot tilts the tray negative ten degrees on the second axis (while the tray is still tilted ten degrees along the first axis). The vibration motor is then activated. The robot may again tilt the tray a positive ten degrees on the first axis and activate the vibration motor. By rocking the tray between negative and positive angles along the second axis, the consolidation robot may be able to further reduce the stow buffers and avoid overlapping the items.

In another embodiment, the consolidation robot changes the tilt of the tray while continuously vibrating the items. For example, the consolidation robot may first tilt the tray along a first axis ten degrees for a first period of time and then tilt the tray a negative ten degrees on the first axis while continuously vibrating the items (i.e., while the vibration motor is active). Thus, in this example the consolidation robot changes the tilt of the tray while simultaneously vibrating the items. Moreover, the consolidation robot may change the strength of the vibrations while changing the tilt of the tray (e.g., when rocking the tray between positive and negative ten degrees along the first axis). That is, the consolidation robot can start or stop the vibration motor at intervals or increase and decrease the frequency of the vibrations. The method can then repeat at block 630 when a different axis is selected.

As discussed above, the method 600 may be performed once or multiple times with different tilt angles to reduce the stow buffer. Once the consolidation robot determines at block 630 to stop the consolidation action, the method 600 proceeds to block 635 where the consolidation robot returns the tray to a position used when the stowing robot places items in the tray (e.g., a flat orientation where the tray is not tilted). For example, after completing method 600, block 320 in method 300 may be performed where the stowing robot determines whether additional items can be placed on the tray. After the stowing robot places additional items are placed on the tray, the method 600 can be repeated to reduce the stow buffer introduced by the stowing robot when placing the additional items on the tray.

Figure 8:
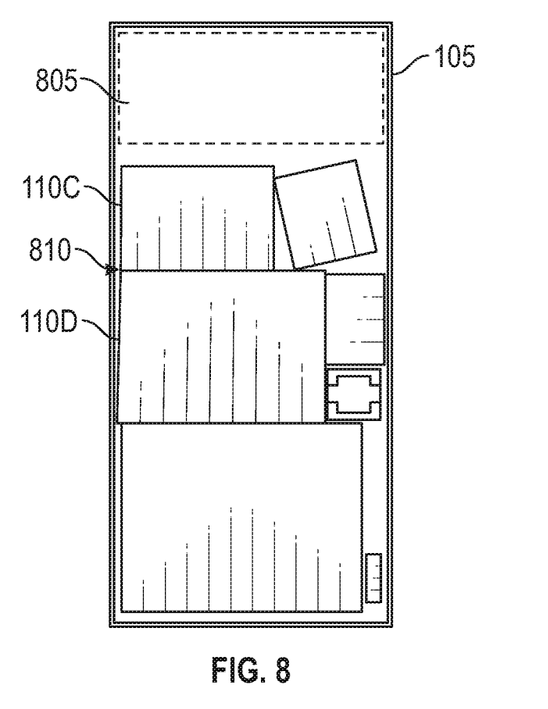
FIG. 8 illustrates a top view of a tray where the stow buffers have been reduced, according to one embodiment described herein.

FIG. 8 illustrates a top view of a tray 105 where the stow buffers have been reduced, according to one embodiment described herein. In one embodiment, FIG. 8 illustrates a view of the tray after the consolidation robot has performed the method 600. In this example, the tray 105 was titled such that the lower side was lowered relative to the upper side. The motion caused by the vibration motor causes the items 110 to slide towards the lower side. Moreover, the stow buffer between some or all of the items 110 is reduced as the items slide towards the lower side. In this example, a stow buffer between the items 110C and 110D has been removed completed such that there is direct, non-overlapping contact 810 between the items. For example, using a predefined time or a feedback system, the consolidation robot can activate the vibration motor to reduce the stow buffer and cause one or more items of the tray 105 to directly contact but without overlapping.

Moving the items to the lower side of the tray 105, consolidates the stow buffers to create the available space 805 near the upper side of the tray 105. Put differently, the space saved on the tray 105 from reducing the stow buffers is converted into the available space 805. The available space 805 can be evaluated by the stowing robot which determines whether an available item can be placed within the space 805. For example, the stowing robot may place one or more additional items in the available space 805 using its stowing algorithm.

Figure 9:
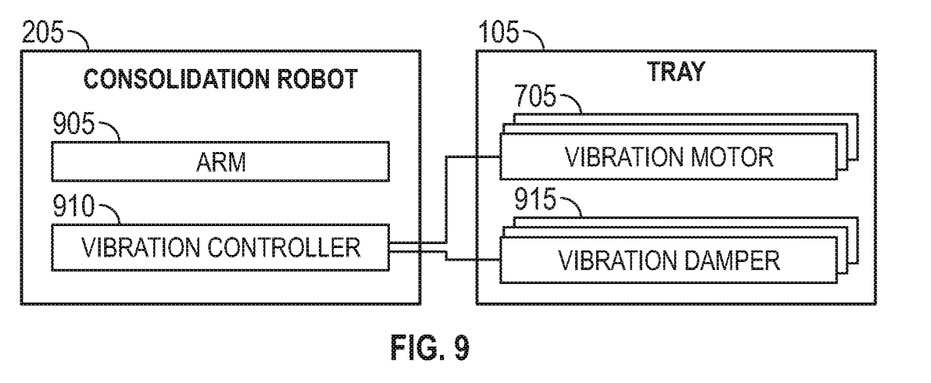
FIG. 9 illustrates a system for controlling vibrations on the tray, according to one embodiment described herein.

FIG. 9 illustrates a system for controlling vibrations on the tray, according to one embodiment described herein. The system includes the consolidation robot 205 and the tray 105. In this example, the consolidation robot 205 includes an arm 905 and a controller 910. The arm 905 supports the tray 105. In one embodiment, the arm 905 can retrieve the tray 105 from a shelf and hold the tray 105 while a stowing robot places items onto the tray 105. The controller 910 can instruct the arm 905 to tilt the tray to perform a consolidation action as described above.

The controller 910 can include a processor and logic for controlling the arm 905 and one or more vibration motors 705 and vibration dampers 915 on the tray 105. In one embodiment, the vibration motors 705 are disposed on different locations of the tray 105. For example, one vibration motor 705 is disposed on one side of the tray 105 while another motor 705 is disposed on the opposite side of the tray. Doing so may enable the controller 910 to control the vibrations in the tray 105. For example, activating only one of the vibration motors 705 can focus the vibrations on the corresponding side of the tray 105 while the other side of the tray 105 experiences weaker vibrations. Doing so may reduce the risk of the item overlapping. For instance, reducing the vibrations on the lower side of the tray (where the items are moving to) may mitigate the risk of the items overlapping. As such, the controller 910 may activate the vibration motor 705 disposed nearest the raised side of the tray 105 when tilted but deactivate (or reduce the strength of) the vibration motor 705 on the lower side of the tray 105 where the items congregate.

The vibration dampers 915 can also be used to control vibrations in the tray 105. For example, the tray 105 may include a vibration damper 915 on each side, or on two opposing sides, of the tray 105. The controller 910 can activate the dampers 915 in the region where the vibrations should be minimized (e.g., a region in the tray 105 where vibrations are most likely to cause overlap when performing the consolidation action). In one embodiment, the vibration dampers 915 may be clamps that include vibration damping material that when brought into contact with the surface of the tray 105, absorb vibrations on the tray 105. Although the vibration dampers 915 are shown on the tray 105, in other embodiments the dampers 915 may be built into the arm 905 of the consolidation robot 205.

In one embodiment, the tray 105 may use only the vibration motors 705 (and not the vibration dampers 915) to control vibrations in multiple regions in the tray 105. In another embodiment, the tray 105 may include only one vibration motor 705 (e.g., disposed at a central location of the tray 105 or near a side of the tray 105 where vibrations should be the strongest) and use the vibration dampers 915 to mitigate vibrations in regions of the tray 105 that should have weaker vibrations to avoid overlap. However, in other embodiments, the tray 105 can include multiple vibration motors 705 in combination with one or more vibration dampers 915 to control the vibrations in the tray 105.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
   a consolidation robot comprising an arm;
   a tray configured to attach to the arm, wherein the tray comprises a transport surface configured to hold at least two items having different shapes,
   wherein the consolidation robot is configured to perform a consolidation action comprising:
   tilting the tray along at least a first axis;

activating a vibration motor to cause vibrations on the transport surface of the tray, thereby moving the at least two items towards a lower side of the tilted tray, wherein moving the at least two items reduces a gap between the at least two items and creates an available space near a raised side of the tilted tray; and a stowing robot configured to stow additional items onto the tray in the available space.

2. The system of claim 1, further comprising a feedback system, wherein the feedback system is configured to monitor the at least two items as the at least two items move on the tray and generate a signal indicating when to stop the vibration motor.

3. The system of claim 1, wherein the consolidation action activates the vibration motor for a predefined period of time, wherein the predefined period of time is selected based on a packaging type of the at least two items.

4. The system of claim 1, wherein the consolidation action comprises:
tilting the tray along the first axis and a second axis while activating the vibration motor.

5. The system of claim 1, wherein the consolidation action comprises:
tilting the tray along a second axis after tilting the tray along the first axis; and
continuously activating the vibration motor to reduce the gap between the at least two items when tilting the tray along the second axis.

6. The system of claim 1, wherein, after the stowing robot has placed the additional items in the tray, the consolidation robot is configured to perform a second consolidation action by tilting the tray and activating the vibration motor to reduce a gap between the additional items.

7. A method, comprising:
tilting a container along at least a first axis, wherein the container comprises a plurality of items disposed on a transport surface, wherein the plurality of items are separated from each other by stow buffers;
activating a vibration motor to move the plurality of items towards a lower side of the tilted container and reduce the stow buffers between the plurality of items; and
stowing, using a stowing robot, at least one additional item on the container after deactivating the vibration motor.

8. The method of claim 7, wherein the at least one additional item is disposed in an available space created when the vibration motor was activated, wherein the available space is proximate to a raised side of the tilted container.

9. The method of claim 7, further comprising, after stowing the at least one additional item:
tilting the container;
activating the vibration motor to move the at least one additional item and reduce a stow buffer between the at least one additional item and at least one of the plurality of items to create a different available space in the tilted container; and
stowing at least one more item in the different available space.

10. The method of claim 7, further comprising:
determining a time to stop the vibration motor based on monitoring the stow buffers using a camera vision system.

11. The method of claim 7, further comprising:
identifying a packaging type of at least one of the plurality of items; and
determining a duration to activate the vibration motor based on the packaging type.

12. The method of claim 7, wherein tilting the container on the first axis comprises:
tilting the container on both the first axis and a second axis while activating the vibration motor.

13. The method of claim 12, wherein the container is tilted on the second axis using a positive angle, the method further comprising:
tilting the container on the second axis using a negative angle, wherein the tilt along the first axis remains unchanged; and
continuously activating the vibration motor while tilting the container from the positive angle to the negative angle along the second axis.

14. The method of claim 7, further comprising:
receiving an indication that the stowing robot cannot place any additional items onto the container before tilting the container on the first axis and before activating the vibration motor.

15. A system, comprising:
a consolidation robot configured to hold a container, wherein the container is configured to hold a plurality of items separated from each other by stow buffers; and
a controller configured to:
instruct the consolidation robot to tilt the container along at least a first axis; and
activate a vibration motor to move the plurality of items towards a lower side of the tilted container and reduce the stow buffers between the plurality of items thereby creating an available space near a raised side of the tilted container.

16. The system of claim 15, wherein the controller is configured to:
stop the vibration motor;
tilt the container after at least one additional item is stowed in the available space; and
reactivate the vibration motor to move the at least one additional item and reduce a stow buffer between the at least one additional item and at least one of the plurality of items to create a different available space in the tilted container.

17. The system of claim 15, wherein the controller is configured to:
determine a time to stop the vibration motor based on monitoring the stow buffers using a camera vision system.

18. The system of claim 15, wherein the controller is configured to:
identify a packaging type of at least one of the plurality of items; and
determine a duration to activate the vibration motor based on the packaging type.

19. The system of claim 15, wherein the controller is configured to instruct the consolidation robot to tilt the container on both the first axis and a second axis before activating the vibration motor.

20. The system of claim 19, wherein the controller is configured to:
tilt the container on the second axis using a positive angle;
tilt the container on the second axis using a negative angle, wherein the tilt along the first axis remains unchanged; and
continuously activating the vibration motor when tilting the container between the positive and negative angles.

* * * * *